UNITED STATES PATENT OFFICE.

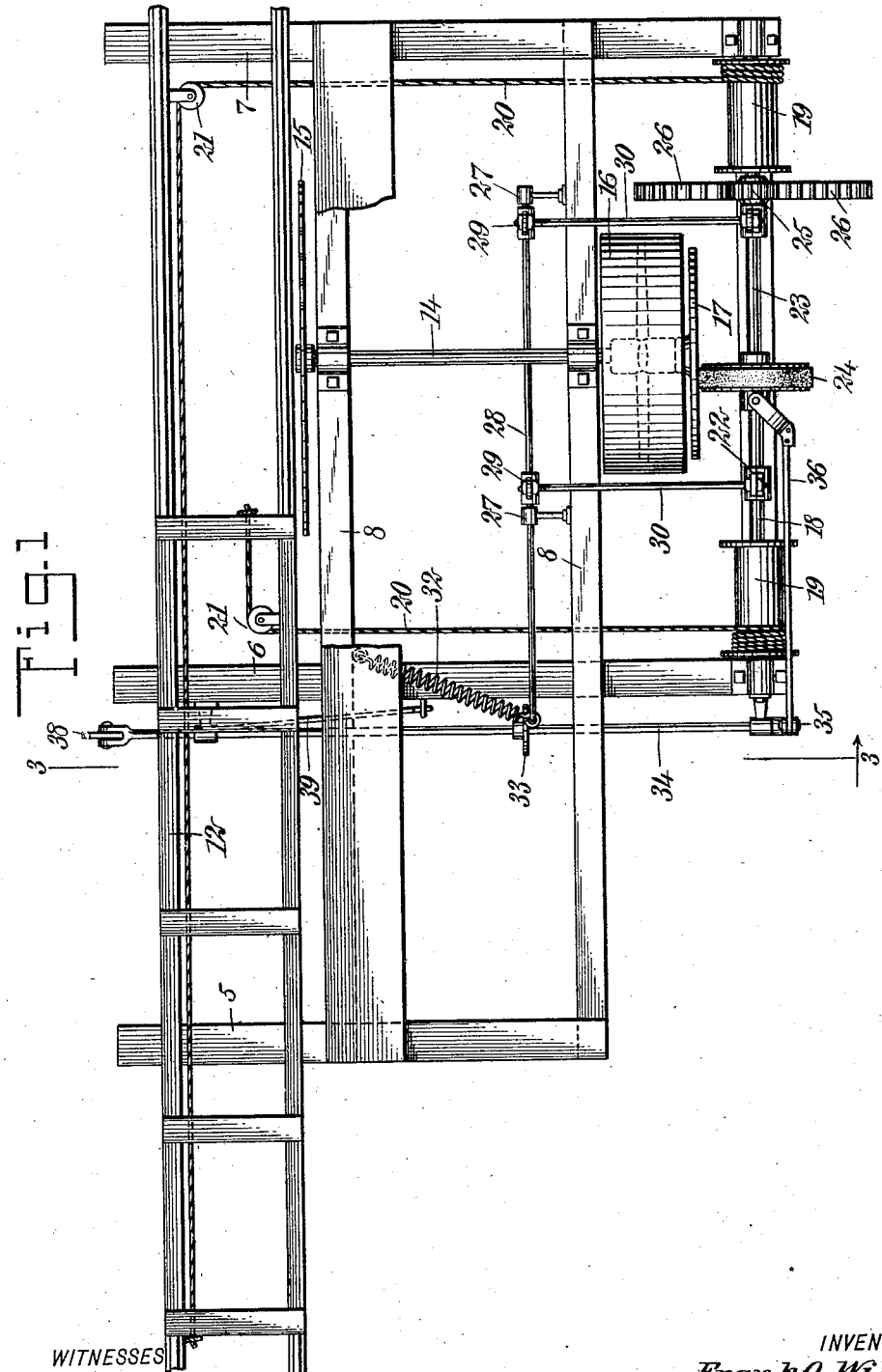

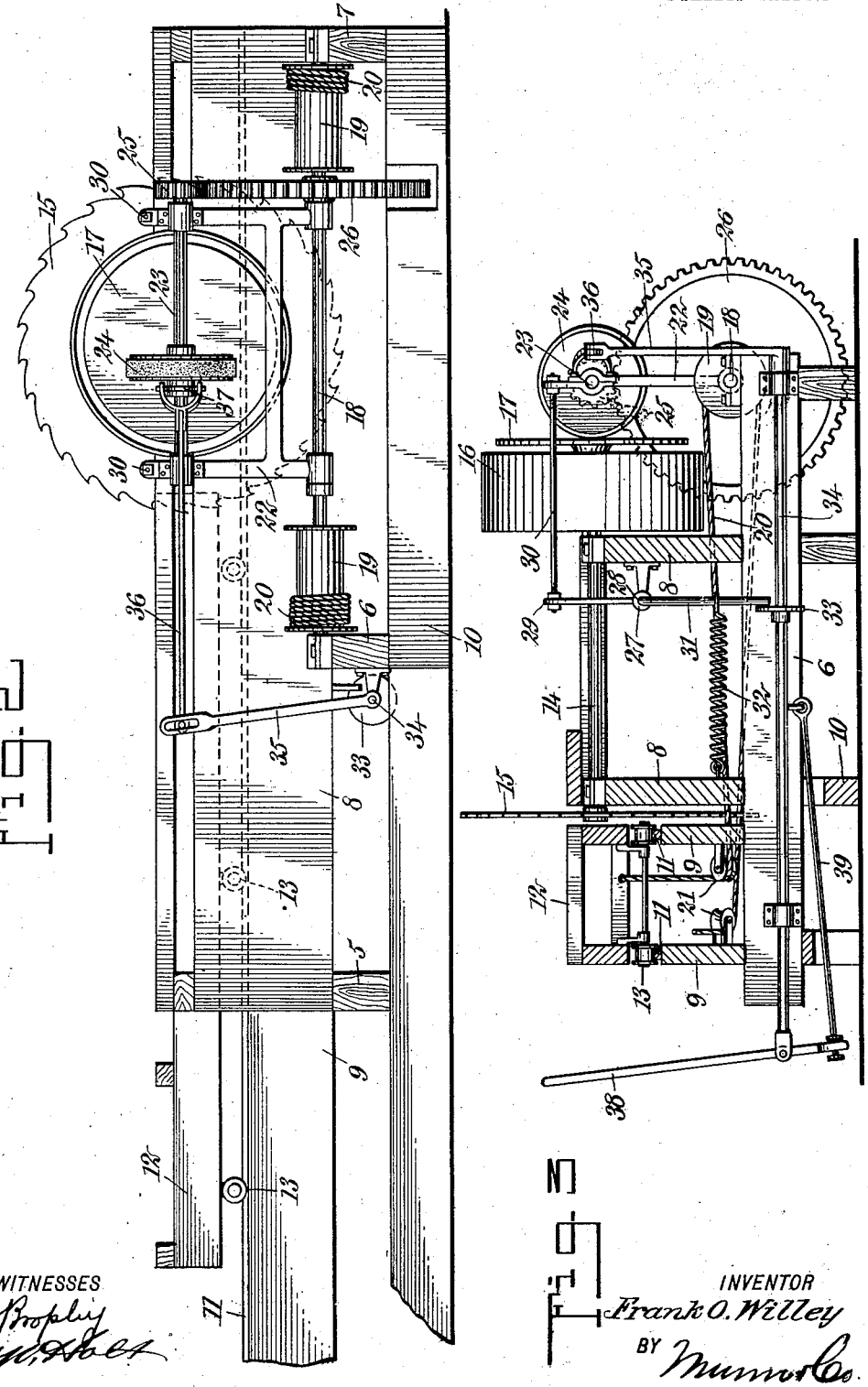

FRANK O. WILLEY, OF WESTPORT, INDIANA.

SAWMILL.

No. 906,343.  Specification of Letters Patent.  Patented Dec. 8, 1908.

Application filed October 22, 1907. Serial No. 398,614.

To all whom it may concern:

Be it known that I, FRANK O. WILLEY, a citizen of the United States, and a resident of Westport, in the county of Decatur and State of Indiana, have invented a new and Improved Sawmill, of which the following is a full, clear, and exact description.

The object of this invention primarily is to provide in connection with a saw mill or other like cutting machine, a variable feed which is under the absolute control of the operator, and which will give every possible rate of travel to the feed carriage within certain limits, in either direction.

The invention further resides in certain novel features of construction and combination of parts, as will be hereinafter described and set forth in the claims.

Reference is to be had to the accompanying drawings forming a part of this specification, in which similar characters of reference indicate corresponding parts in all the views.

Figure 1 is a plan of a mill showing the guide rail or support of the frame partly broken away; Fig. 2 is a side elevation of the same; and Fig. 3 is a cross-section of the mill substantially on the line 3—3 of Fig. 1 looking in the direction of the arrow.

The frame of the mill to which I have shown my improvements applied is composed of cross-sills 5, 6 and 7 and longitudinal beams 8, 8 and 9, 9 superposed thereon, the whole being mounted on a suitable base 10. On the beams 9, 9 are laid rails 11 on which travels the feed carriage 12, the latter being supported upon and movable over the rails on grooved wheels 13.

In suitable bearings carried by the beams 8, between the sills 6 and 7, is journaled the saw arbor 14, carrying the saw or other like cutter 15 between the adjacent beams 8 and 9; and at its opposite end a driving pulley 16 and an adjacent friction-disk 17.

Arranged at substantially right-angles to the saw arbor, and journaled in bearings carried by the sills 6 and 7 at the outside of the friction disk 17, is a shaft 18 having drums 19 affixed near its opposite ends, about which are reversely wound flexible lines or cables 20 which pass to the feed carriage 12 and are directed oppositely to each other by pulleys 21, from which points they pass to the opposite ends of the carriage and are secured.

Intermediate the drums 19 the shaft 18 pivotally supports a frame 22, the same being constructed with upwardly-projecting arms having bearings in which is journaled a shaft 23, the latter having a friction-wheel 24, filled with a friction fiber, slidably splined thereto, and further provided with a gear 25 intermeshing with a somewhat larger gear 26 secured to the shaft 18.

At the inside of the outer beam 8, bearings 27 are provided for revolubly supporting a shaft 28 which is connected to the swinging or pivoted frame 22 through the intermediary of upwardly-projecting arms 29 and cross-bolts 30, the latter connecting the arms 29 with the arms of the frame 22, and having sufficient play such that the shaft 28 has a limited pivotal movement, whereby the friction-wheel 24 may be moved into and out of contact with the friction-disk 17.

For normally holding the friction-wheel separated or disengaged from the friction-disk, the shaft 28 is provided with a depending arm 31 to which is connected a tension spring 32 attached to some fixed portion of the machine frame, as one of the longitudinal beams 8, best shown in Fig. 3.

The inward movement of the arm 31, and consequently the separation of the friction-wheel from the friction-disk, is limited by a collar or other equivalent device 33 attached to a shifting-bar 34, the said bar being slidably and revolubly mounted in suitable bearings carried by the cross-sill 6.

At that end of the shifting-bar adjacent to the frictional drive of the carriage feed, it is provided with an upwardly-projecting arm 35, the latter carrying a link 36 having a forked end which connects with the hub of the friction wheel by the aid of the usual collar or ring connection 37, whereby the wheel may revolve independently of the link, but is enforced to travel on the shaft 23 by revolving the shifting-bar 34.

At that end of the shifting-bar removed from the frictional drive of the feeding mechanism, is fulcrumed an operating lever 38 which is extended a slight distance therebelow where it is connected with a fulcrumed bar 39, the latter being swingingly connected at its opposite end to the mill frame, as best shown in Fig. 3.

From the construction described it is apparent that when the saw is driven from the pulley 16, the feeding mechanism for the carriage will remain in inaction until the operating lever is forced inwardly to bring the friction-wheel in contact with the friction-disk at either side of its center. At this time if the friction-wheel be in contact with the friction-disk at the proper side of its center, the carriage with the work thereon will be moved in the direction of the saw; this rate of travel being adapted to be changed to every possible speed in either direction within certain limits by throwing the lever 38 sidewise, when pressed inwardly, in one direction or the other; thus causing the friction-wheel to traverse the friction-disk at either side of its center.

It is apparent that my improved feeding mechanism may be applied to saw mills different in construction from that herein shown and described, and that changes may be made in the detail construction of the feeding mechanism, without departing from the nature of the invention as defined in the claims annexed.

Having thus described my invention, I claim as new and desire to secure by Letters Patent:

1. In a machine of the character described, a mandrel for carrying a cutter, a carriage for carrying the work movable to and from the cutter, a shaft having drums provided with cables reversely wound thereon and oppositely connected to the carriage, means for driving the mandrel, a friction-disk carried by the mandrel, a frame swingingly mounted on said shaft, a second shaft journaled in the frame and geared with the first-named shaft, a friction-wheel slidably splined to the second shaft and movable over the face of said disk, and means for operating the said wheel.

2. In a machine of the character described, a mandrel for carrying a cutter, a carriage for carrying the work movable to and from the cutter, a shaft having drums provided with cables reversely wound thereon and oppositely connected to the carriage, means for driving the mandrel, a friction-disk carried by the mandrel, a frame swingingly mounted on said shaft, a second shaft journaled in the frame and geared with the first-named shaft, a friction-wheel slidably splined to the second shaft and movable over the face of said disk, means operating to normally separate the friction-disk and friction-wheel, and means operable to force the friction-wheel into contact with the friction-disk against the action of the last-named means and slide the friction-wheel on its shaft.

3. In a machine of the character described, a cutter, a carriage for feeding the work to the cutter, a friction-disk movable with the cutter, a shaft having drums provided with cables reversely wound thereabout and oppositely connected to said carriage, a frame swingingly mounted on said shaft, a friction-wheel for driving said shaft carried by said frame and movable over the face of said disk, means normally forcing said frame in one direction to separate the friction-wheel from the friction-disk, and means operable to force the friction-wheel against the friction-disk against the action of the last-named means and move the friction-wheel over the face of said disk.

In testimony whereof I have signed my name to this specification in the presence of two subscribing witnesses.

FRANK O. WILLEY.

Witnesses:
LENNA HARMAN,
JOHN C. HAYS.